(12) United States Patent
Hoenigmann et al.

(10) Patent No.: US 8,709,579 B2
(45) Date of Patent: *Apr. 29, 2014

(54) STRETCHABLE ELASTIC LAMINATE HAVING INCREASED CD ELONGATION ZONES AND METHOD OF PRODUCTION

(75) Inventors: Martin F. Hoenigmann, Chippewa Falls, WI (US); Jeffrey Alan Middlesworth, Wauconda, IL (US); Amiel Bassam Sabbagh, Winchester, VA (US)

(73) Assignee: Pliant, LLC, Dover, DE (US)

( * ) Notice: Subject to any disclaimer, the term of this patent is extended or adjusted under 35 U.S.C. 154(b) by 662 days.

This patent is subject to a terminal disclaimer.

(21) Appl. No.: 12/516,002

(22) PCT Filed: Nov. 21, 2007

(86) PCT No.: PCT/US2007/085338
§ 371 (c)(1),
(2), (4) Date: May 22, 2009

(87) PCT Pub. No.: WO2008/064287
PCT Pub. Date: May 29, 2008

(65) Prior Publication Data
US 2010/0062221 A1   Mar. 11, 2010

Related U.S. Application Data

(60) Provisional application No. 60/866,964, filed on Nov. 22, 2006.

(51) Int. Cl.
*B32B 3/00* (2006.01)
*D04H 3/00* (2012.01)
*B29C 59/04* (2006.01)

(52) U.S. Cl.
USPC .............................. 428/156; 428/98; 428/174

(58) Field of Classification Search
USPC ............................................. 428/156, 98, 174
See application file for complete search history.

(56) References Cited

U.S. PATENT DOCUMENTS

| | | |
|---|---|---|
| 3,484,835 A | 12/1969 | Trounstine et al. |
| 3,849,241 A | 11/1974 | Butin et al. |

(Continued)

FOREIGN PATENT DOCUMENTS

WO   WO 01/51548 A2 *   7/2011   .................. C08J 5/18

OTHER PUBLICATIONS

Supplementary European Search Report corresponding to European Patent Application No. 07845128.3-1217, dated Oct. 9, 2009.

(Continued)

*Primary Examiner* — Brent O'Hern
(74) *Attorney, Agent, or Firm* — Barnes & Thornburg LLP (57) ABSTRACT

A stretchable elastic laminate including at least one nonwoven fabric layer, and at least one elastomeric material extruded as a melt onto a major surface of the nonwoven fabric to form an elastic layer bonded to the surface of the nonwoven fabric. The nonwoven fabric layer has first and second bonding zones formed on the surface thereof, which have first and second bonding strengths. The elastic layer is bonded to the surface of the nonwoven fabric such that the elastic layer forms a stronger bond with the first bonding zone on the surface of the nonwoven than the bond formed between the elastic layer and the second bonding zone on the surface of the nonwoven. The lightly bonded areas of the elastic laminate provide increased elongation in the cross direction and improved recovery after stretch, while the more strongly bonded areas provide adhesive strength. Also disclosed is a method of forming a stretchable laminate having increased elongation and improved recovery after stretch.

25 Claims, 3 Drawing Sheets

Rectangular Deep Embossing Pattern (56) References Cited

U.S. PATENT DOCUMENTS

| | | | | |
|---|---|---|---|---|
| 4,818,597 | A | * | 4/1989 | DaPonte et al. ............... 442/382 |
| 6,069,097 | A | * | 5/2000 | Suzuki et al. ................. 442/328 |
| 6,258,308 | B1 | | 7/2001 | Brady et al. |
| 6,951,591 | B2 | | 10/2005 | Mortellite |
| 2003/0118764 | A1 | | 6/2003 | Adams et al. |
| 2003/0145938 | A1 | | 8/2003 | Mortellite et al. |
| 2004/0219854 | A1 | * | 11/2004 | Groitzsch et al. ............. 442/328 |
| 2008/0003911 | A1 | * | 1/2008 | Sabbagh et al. ............. 442/327 |

OTHER PUBLICATIONS

International Preliminary Report on Patentability for International Patent Application Serial No. PCT/US2007/085338, mailed Jun. 4, 2009.

EPO communication dated Nov. 3, 2010.

International Search Report and Written Opinion corresponding to International Patent Application Serial No. PCT/US2007/085338, dated Mar. 13, 2008.

* cited by examiner

Rectangular Deep Embossing Pattern

FIG. 3

Dot Deep Embossing Pattern

STRETCHABLE ELASTIC LAMINATE HAVING INCREASED CD ELONGATION ZONES AND METHOD OF PRODUCTION

This application is a US National Stage Application of International Application Number PCT/US2007/085338, filed Nov. 21, 2007, and claims priority to Provisional Application No. 60/866,964, filed Nov. 22, 2006.

BACKGROUND OF THE INVENTION

The presently described technology relates generally to stretchable elastic laminates. More specifically, the present technology relates to stretchable elastic laminates formed from an elastic melt layer and a non-woven layer and having zones of increased cross-direction (CD) elongation which enable the laminate to have improved recovery after stretch. The elastic laminate also may have low stretch zones that facilitate attachment of the elastic laminate to nonstretchy films, laminates or hooks in a disposable article.

Disposable absorbent articles (e.g., disposable diapers for children or adults) often include elastic features designed to provide enhanced and sustainable comfort and fit to the wearer by conformably fitting to the wearer over time. Examples of such elastic features may include, for example, elastic waistbands, elastic leg cuffs, elastic side tabs, or elastic side panels so that the absorbent article can expand and contract to conform to the wearer in varying directions. Additionally, such elastic features are often required to be breathable to provide a desired level of comfort to the wearer's skin.

Further, the elastic features of disposable absorbent articles may be made of stretchable elastic laminates. A stretchable elastic laminate typically includes an elastic film and a non-woven fabric. More particularly, the elastic film is typically bonded to the non-woven fabric to form the stretchable elastic laminate.

A nonwoven elastomeric laminate is disclosed, for example, in U.S. published application No. 2005/0287892 A1. According to the disclosure, the nonwoven web is one in which the fibers are thermally bonded to form the web material. An elastomeric film is directly bonded to the nonwoven web layer by feeding the elastomeric film and the nonwoven web to the nip between two calender rollers. Pressure between the calender rollers ranges from about 0.25 to about 5 bar. Pressures at the lower end of the range are stated as being preferred, in order to insure that the elastomeric material does not become deeply embedded in the nonwoven web.

Bonding the elastic film to the non-woven fabric typically requires a secondary bonding operation. For example, U.S. Pat. No. 6,069,097 (the '097 patent) describes forming a stretchable elastic laminate using a secondary bonding operation to bond an elastic film to a non-woven fabric. The '097 patent discloses using a heated embossing roller and a chilled roller to bond a co-extruded elastic film to a spunlace non-woven fabric to form the composite elastic sheet, (col. 14, lines 7-20). Further, the '097 patent discloses that the composite sheet should be bonded in a particular pattern, namely that the composite should be bonded in a direction perpendicular to the direction of elongation, and also that the bond sites should be positioned so that bond sites on either side of the elastic sheet do not overlap with the bond sites on the other side.

Additionally, for example, U.S. Pat. App. Pub. No. 2004/0121687 (the '687 publication) describes forming a stretchable elastic laminate using a secondary bonding operation to bond an elastic film to a non-woven fabric. The '687 publication discloses that a stretchable laminate is formed using nip rolls 46, 48 to bond an elastomeric sheet 14 to an extensible nonwoven web 12 (paragraph 0088). According to the '687 publication, the extensible nonwoven web 12 may be laminated to the elastomeric sheet by a variety of processes including but not limited to adhesive bonding, point bonding, ultrasonic welding and combinations thereof" (paragraph 0090).

Furthermore, the '687 publication also describes the extensible nonwoven web 12 as "a necked spunbonded web, a necked meltblown web or a necked bonded carded web" (paragraph 0065). Moreover, stretching the nonwoven web in one direction not only causes necking in the other direction, but may also cause the nonwoven web to become thicker. A variation in thickness may require more complicated set-up procedures and additional processing equipment when utilizing the nonwoven web in different manufacturing operations, thus resulting in increased manufacturing costs. Further, necking of the nonwoven web may cause orientation of the fibers which may result in a striated appearance that may not be aesthetically pleasing.

Employing a secondary bonding operation to form the stretchable laminate typically increases the production cost of the stretchable elastic laminate. Thus, there is a need for a low-cost stretchable elastic laminate that does not require a secondary bonding operation.

Improving the elasticity of the stretchable elastic laminate typically requires stretch activation, which typically requires a secondary stretching operation. For example, U.S. Pat. No. 6,313,372 (the '372 patent) relates to a stretch-activated plastic composite. According to the '372 patent, "it may be desirable that such stretch activation be done either prior to or during production of a product using the composite" (col. 4, lines 37-39).

Additionally, for example, the '687 publication describes stretching a non-woven fabric with two pairs of rollers, each pair of rollers operating at a different speed. More particularly, the '687 publication describes necking an extensible nonwoven web 12 using a first nip 30, including nip rolls 32, 34 turning at a first surface velocity, and a second nip 36, including nip rolls 38, 40 turning at a second surface velocity that is higher than the first surface velocity (paragraph 0085). The '687 publication also describes mechanically stretching the laminate 50 using grooved rolls 58, 60 (paragraph 91) or a tenter frame 66 (paragraph 92).

Therefore, the secondary stretching operation typically increases the production cost of the stretchable elastic laminate. Thus, there is a need for a low-cost stretchable elastic laminate with improved elasticity that does not require a secondary stretching operation.

BRIEF SUMMARY OF THE INVENTION

The presently described technology is directed to a stretchable laminate that has improved stretch properties such as improved elongation to break and low permanent deformation, as well as high tensile strength, high delamination resistance and aesthetic appeal.

In one aspect, the present technology is directed to a stretchable laminate that includes a nonwoven fabric that is stretchable in at least one direction and an elastic material extruded as a melt onto a major surface of the non-woven fabric such that the melt forms an elastic layer bonded to the surface of the nonwoven fabric.

In another aspect, the present technology is directed to a stretchable laminate that includes a nonwoven fabric that is stretchable in at least one direction and has first and second machine direction oriented zones, with the first zone being more compressed than the second zone, and an elastic material applied as a melt to a major surface of the nonwoven fabric, wherein the melt forms an elastic layer that is bonded to the surface of the nonwoven, with the elastic layer being more strongly bonded to the surface of the nonwoven fabric at the first zone than at the second zone.

In another aspect, the present technology is directed to a stretchable laminate that includes a nonwoven fabric that is stretchable in at least one direction, and an elastic material applied as a melt to a major surface of the nonwoven fabric, and wherein the laminate also includes low stretch zones to facilitate attachment to nonstretching films, laminates or hooks in a disposable garment.

In another aspect, the present technology is directed to a method of making a stretchable laminate which includes heating an elastic material to form an elastic melt and applying the melt to a major surface of at least one nonwoven fabric layer wherein the fabric is stretchable in at least one direction, to form an elastic layer bonded to the surface of the nonwoven fabric, and contacting the nonwoven fabric with a grooved roll during formation of the laminate to create first and second bonding zones on a major surface of the nonwoven fabric, wherein the bonding strength of the first bonding zone to the elastic layer is greater than the bonding strength of the second bonding zone to the elastic layer.

In another aspect, the present technology is directed to a method of perforating the laminate or the elastic layer within the laminate to improve its breathability.

In another aspect, the present technology is directed to a method of minimizing the stretch in selected zones of the laminate to facilitate a secure attachment to nonstretchy films, laminates or hooks in a disposable garment.

In another aspect, the present technology is directed to a method of increasing the elongation of the elastic laminate.

In a further aspect, the present technology is directed to an absorbent article comprised of a component (for example, a side tab, a side panel, a waistband or an elastic belt substrate) that comprises a stretchable laminate that includes a nonwoven fabric that is stretchable in at least one direction, and an elastic material applied as a melt to a major surface of the nonwoven fabric, and further comprises areas of increased CD elongation and areas of low stretch.

BRIEF DESCRIPTION OF SEVERAL VIEWS OF THE DRAWINGS

While the specification concludes with claims particularly pointing out and distinctly claiming the subject matter which is regarded as the presently described technology of the present invention; it is believed that the presently described technology will be more fully understood from the following description taken in conjunction with the accompanying figures, in which:

DETAILED DESCRIPTION OF THE PREFERRED EMBODIMENTS

The stretchable elastic laminates, methods of producing such laminates, and articles incorporating the stretchable elastic laminates of the presently described technology are suited for a variety of uses and applications, in particular for use in garments, such as a disposable absorbent article.

As used herein, the term "absorbent article" refers to a device which absorbs and contains body exudates, and more specifically, refers to a device which is placed against the skin of a wearer to absorb and contain the various exudates discharged from the body. Examples of absorbent articles include diapers, pull-on pants, training pants, incontinence briefs, diaper holders, feminine hygiene garments, and the like.

The term "disposable" is used herein to describe absorbent articles, which generally are not intended to be laundered or otherwise restored or reused as absorbent articles, but rather discarded after use by the wearer.

The term "elastic" refers herein to any material that upon application of a force to its relaxed, initial length can stretch or elongate without substantial rupture and breakage by at least 50% of its initial length, and which can recover at least 30% of its initial length upon release of the applied force.

The term "spunlace nonwoven fabric" as used herein refers to a structure of individual fibers or threads which are physically entangled, without thermal bonding. Physical entanglement may be achieved using a water entanglement process or alternatively, a needling process or a combination of both processes. Spunlace nonwoven fabric is distinguishable from "spun-bonded nonwoven fabric" in that spun-bonded nonwoven fabric has thermal bonding points between individual fibers in the nonwoven fabric, such that the fibers are thermally bonded into a cohesive web.

The term "machine direction" for a nonwoven fabric, web or laminate refers to the direction in which it was produced. The terms "cross direction" or "transverse direction" refer to the direction perpendicular to the machine direction.

The terms "stretchable" or "extensible" refer herein to a material that can be stretched, without substantial breaking, by at least 50% of its relaxed, initial length in at least one direction. The term can include elastic materials, as well as nonwovens that are inherently extensible, but do not recover. Such nonwovens can be made to behave in an elastic manner by bonding them to elastic films.

The term "delamination" refers to a failure of the bond between the nonwoven and film after some amount of stretching. Delamination typically is evident as a raised section of nonwoven over 10 mm of the laminate in any direction.

The stretchable laminate of the present technology comprises at least one nonwoven fabric and an elastic material extruded as a melt onto a major surface of the nonwoven fabric, wherein the melt forms an elastic layer bonded to the surface of the nonwoven fabric. In a preferred embodiment, the laminate is a 3-layer laminate in which an elastic layer is sandwiched between two nonwoven fabric layers, with at least one of the nonwoven fabric layers being formed from a spunlace nonwoven fabric.

The spunlace nonwoven fabric used herein is made from a material having a melting point or softening point that is greater than the temperature of the elastic melt at the time the elastic melt contacts the spunlace nonwoven fabric. Selecting a spunlace nonwoven fabric with a melting point or softening point greater than the temperature of the elastic melt at the time of contact insures that melting of the fibers in the spunlace nonwoven fabric does not occur when the elastic melt is extruded onto the surface of the nonwoven fabric.

Suitable materials for the spunlace nonwoven fabric include high melting temperature materials, such as polyethylene terephthalate (PET), polybutylene terephthalate (PBT), polypropylene terephthalate (PPT), polyacrylonitrile (PAN), polyamides, including polyamide 6 and polyamide 6.6, and polyacrylate (PAC). Other suitable materials for the spunlace nonwoven fabric include materials that do not have a true melting point, but have a high softening temperature range or a high decomposition temperature. Such materials include viscose, aramide, (known commercially as Nomex™), polyvinylalcohol (PVA) (known commercially as Vinylon™), and Rayon. Other polymeric materials, such as polypropylene, may also be used for the spunlace nonwoven fabric. A preferred material for the spunlace nonwoven fabric is PET having a melting point of approximately 260° C. A suitable PET spunlace nonwoven fabric is commercially available from Tomen America Inc. of New York, N.Y., under the product name Tomlace PET. Other suppliers of PET spunlace nonwoven fabric include Sandler Vliesstoffe of Germany.

The spunlace nonwoven fabric may have a basis weight of about 20 to about 80 gsm and is stretchable in an amount of about 50% to about 200% of its initial length. In general, spunlace nonwoven fabrics having a basis weight at the upper end of the range have better strength and are more stretchable than lower basis weight spunlace nonwovens, but are also more expensive. A suitable spunlace nonwoven fabric for use herein has a basis weight of about 30 grams per square meter (gsm) and is stretchable in the cross-direction.

Use of a spunlace nonwoven fabric made from a material having a high melting or decomposition temperature provides a surprisingly high level of laminate elongation compared to other nonwoven fabrics having thermal bonding points. Without wishing to be bound by a particular theory, it is believed that there are three attributes that help create the high level of elongation. First, the high melting or decomposition temperature of the nonwoven (for a PET nonwoven around 260° C.) allows it to retain its fiber integrity even when in contact with the melted elastic material. Second, the relative incompatibility of the nonwoven fabric with the polymers used to form the elastic layer keeps the elastic melt from wetting out the nonwoven fibers and causes the attachment of the nonwoven fabric to the melted elastic material to be a physical trapping of the surface fibers rather than a full chemical bond. This physical trapping helps to allow some sliding of the nonwoven fibers, thereby contributing to the level of elongation. Third, the spunlace nonwoven, being a physically entangled nonwoven rather than a thermally bonded nonwoven, may allow some fiber sliding without requiring much physical separation between the nonwoven fabric and the elastic layer.

The use of a spunlace nonwoven fabric in a stretchable laminate provides additional advantages. For example, the spunlace fabric lends itself to the addition of liquid absorbing natural fibers to the spunlace fabric. Since manufacture of the present laminate does not depend on nonwoven melting to achieve attachment between the elastic layer and the nonwoven fabric, natural fibers that are nonmelting can be added to the spunlace fabric without detrimentally affecting the attachment between the elastic layer and the spunlace fabric. Suitable natural fibers that may be added include cellulose, cotton, wool, flax and hemp. Such added natural fibers contribute to a level of comfort in hygiene applications that cannot be achieved by other nonwoven materials. In addition, natural fibers are biodegradable. By incorporating such fibers into the spunlace nonwoven, or indeed, utilizing a spunlace nonwoven fabric manufactured entirely from natural fibers, and selecting an elastic material that is also biodegradable, the entire elastic laminate structure may be made to be biodegradable, a desirable property for disposable articles to have. A further advantage of utilizing a spunlace nonwoven fabric is that the fabric creates a furrowed appearance in the finished elastic laminate. The furrows generally correspond to the channels created by the hydraulics during nonwoven fabric manufacture, and create an aesthetically appealing laminate with a look that simulates the appearance of incrementally stretched elastic laminates that are popular in disposable absorbent garments.

The high temperature resistance of the spunlace fabric may also be used to advantage for high speed "welding" applications where the spunlace nonwoven layer of the laminate is in close proximity to a hot bar or hot wire, and a more delicate, lower melting temperature material on the opposite surface of the laminate could be kept relatively cool. In such applications, the spunlace fabric can withstand the heat from the hot bar or wire without melting and can transfer some of the heat to the lower layers.

Although a spunlace nonwoven is preferred for the nonwoven layer or layers, other nonwoven fabrics are also suitable for use in the present technology. Such nonwoven fabrics include, for example, those formed by meltblowing processes, spunbonding processes, air laying processes and bonded carded web processes. One example of a suitable nonwoven fabric is a spunbond nonwoven fabric made from fibers containing an elastic core and a polyethylene or polypropylene sheath, which is available from BBA Group under the trade name Dreamex™.

The elastic layer which is extruded onto the nonwoven fabric is formed from one or more thermoplastic materials. Thermoplastic materials suitable for use in the elastic layer or layers in the laminates of the present technology are generally materials that flow when heated sufficiently above their glass transition temperature and become solid when cooled.

Thermoplastic materials that have elastomeric properties are typically called elastomeric materials. Thermoplastic elastomeric materials are generally defined as materials that exhibit high resilience and low creep as though they were covalently crosslinked at ambient temperatures, yet process like thermoplastic nonelastomers and flow when heated above their softening point. Thermoplastic elastomeric materials, in particular block copolymers, useful in practicing the presently described technology can include, for example, linear, radial, star, and tapered block copolymers such as styrene block copolymers, which may include, for example, Kraton® or Kraton®-based styrene block copolymers available from Kraton Polymers, Inc., located in Houston, Tex., styrene-isoprene block copolymers, styrene-(ethylene-butylene) block copolymers, styrene-(ethylene-propylene) block copolymers, and styrene-butadiene block copolymers; polyether esters such as that available under the trade designation HYTREL™ G3548 from E.I. DuPont de Nemours; and polyether block amides such PEBAX™ available from Elf Atochem located in Philadelphia, Pa. Preferably, styrene block copolymers are utilized in practicing the presently described technology. Styrene-ethylene butylene block copolymers are most preferred.

Non-styrene block copolymers (elastomers or plastomers) suitable for use in accordance with the presently described technology include, but are not limited to, ethylene copolymers such as ethylene vinyl acetates, ethylene octene, ethylene butene, and ethylene/propylene copolymer or propylene copolymer elastomers, such as those available under the trade designation VISTAMAXX® available from ExxonMobil, located in Irving, Tex., or ethylene/propylene/diene terpolymer elastomers, and metallocene polyolefins such as polyethylene, poly (1-hexene), copolymers of ethylene and 1-hexene, and poly(1-octene); thermoplastic elastomeric polyurethanes such as that available under the trade designation MORTHANE™ PE44-203 polyurethane from Morton International, Inc., located in Chicago, Ill. and the trade designation ESTANE™ 58237 polyurethane from Noveon Corporation, Inc., located in Cleveland, Ohio; polyvinyl ethers; poly-α-olefin-based thermoplastic elastomeric materials such as those represented by the formula —(CH2CHR)x where R is an alkyl group containing about 2 to about 10 carbon atoms; poly-α-olefins based on metallocene catalysis such as ENGAGE™ 8200, ethylene/poly-α-olefin copolymer available from Dow Plastics Co., located in Midland, Mich.; polybutadienes; polybutylenes; polyisobutylenes such as VISTANEX NM L-80, available from Exxon Chemical Co.; and polyether block amides such PEBAX™ available from Elf Atochem located in Philadelphia, Pa. A preferred elastomer or plastomer of the presently described technology is an ethylene/propylene copolymer or polypropylene copolymer. It is also preferable that the non-styrene block copolymer elastomer or plastomer of the presently described technology comprise from about 10% to about 95% by weight of the elastomeric layer based upon the total weight of the composition. For example, one embodiment of the elastomer or plastomer of the presently described technology may be comprised of a polypropylene copolymer containing from about 50% to about 95% of propylene content.

Additional elastomers which can be utilized in accordance with presently described technology also include, for example, natural rubbers such as CV-60, a controlled viscosity grade of rubber, and SMR-5, a ribbed smoked sheet rubber; butyl rubbers, such as EXXON™ Butyl 268 available from Exxon Chemical Co., located in Houston, Tex.; synthetic polyisoprenes such as CARIFLEX™, available from Shell Oil Co., located in Houston, Tex., and NATSYN™ 2210, available from Goodyear Tire and Rubber Co., located in Akron, Ohio; and styrene-butadiene random copolymer rubbers such as AMERIPOL SYNPOL™ 1101 A, available from American Synpol Co., located in Port Neches, Tex.

The elastic layer can be extruded as a single layer onto the surface of the nonwoven fabric. Alternatively, the elastic layer can comprise a plurality of elastic layers which are formed by co-extruding the melted elastic materials through a suitable co-extrusion die. For example, the elastic layer can comprise a three layer structure, which allows for a core layer sandwiched between two outer layers.

The elastic material used for each of the different layers of the co-extruded elastic layer can be selected from the elastomeric materials described above in order to vary the level of adhesion between the elastic layer and the nonwoven fabric. Adjusting the level of adhesion between the elastic layer and the nonwoven allows one to obtain a desired balance between laminate stretch and delamination resistance. In one embodiment, the multi-layer elastic layer comprises a KRATON™ styrene block copolymer core layer sandwiched between two outer layers formed from VISTAMAXX™ elastomer. Alternatively, the outer layers of the multi-layer elastic layer may be tie layers formed from a material that promotes adhesion between the elastic layer and the nonwoven layer or layers. Such tie layers may be formed from compositions known in the art to promote adhesion between incompatible materials. For example, tie layers may be formed from maleic anhydride grafted polyolefins, such as BYNEL® from DuPont or PLEXAR® from Equistar.

The level of adhesion between the elastic layer and the nonwoven may also be adjusted through the use of adhesive fibers, which can provide adhesive bonding between the nonwoven fabric and the elastic layer where a low level of stretch is desired. Such adhesive fibers may include, for example, polyvinyl alcohol fibers, alginic fibers, fibers made from hot melt adhesives, or fibers made from thermoplastic materials having a low softening or melting point.

It will be appreciated by those skilled in the art that additives may be added to the one or more layers of the presently described laminates in order to improve certain characteristics of the particular layer. Preferred additives include, but are not limited to, color concentrates, neutralizers, process aids, lubricants, stabilizers, hydrocarbon resins, antistatics, antiblocking agents and fillers. It will also be appreciated that a color concentrate may be added to yield a colored layer, an opaque layer, or a translucent layer. A suitable neutralizer may include, for example, calcium carbonate, while a suitable processing aid may include, for example, calcium stearate.

Suitable antistatic agents may include, for example, substantially straight-chain and saturated aliphatic, tertiary amines containing an aliphatic radical having from about 10 to about 20 carbon atoms that are substituted by ω-hydroxy-$(C_1-C_4)$-alkyl groups, and N,N-bis-(2-hydroxyethyl)alkylamines having from about 10 to about 20 carbon atoms in the alkyl group. Other suitable antistatics can include ethoxylated or propoxylated polydiorganosiloxanes such as polydialkylsiloxanes and polyalkylphenylsiloxanes, and alkali metal alkanesulfonates.

Antiblocking agents suitable for use with the presently described laminates include, but are not limited to, calcium carbonate, aluminum silicate, magnesium silicate, calcium phosphate, silicon dioxide, and diatomaceous earth. Such agents can also include polyamides, polycarbonates, and polyesters.

Additional processing aids that may be used in accordance with the presently described technology include, for example, higher aliphatic acid esters, higher aliphatic acid amides, metal soaps, polydimethylsiloxanes, and waxes. Conventional processing aids for polymers of ethylene, propylene, and other α-olefins are preferably employed in the present technology. In particular, alkali metal carbonates, alkaline earth metal carbonates, phenolic stabilizers, alkali metal stearates, and alkaline earth metal stearates can be used as processing aids.

Fillers may be added to the elastic material to promote a microporous structure within the elastic layer when the layer is stretched. Examples of useful fillers include, but are not limited to, alkali metal and alkaline earth metal carbonates, such as sodium carbonate ($Na_2CO_3$), calcium carbonate ($CaCO_3$), and magnesium carbonate ($MgCO_3$), nonswellable clays, silica ($SiO_2$), magnesium sulfate, magnesium oxide, calcium oxide, alumina, mica, talc, titanium dioxide, zeolites, aluminum sulfate, barium sulfate, and aluminum hydroxide.

Figure 1:
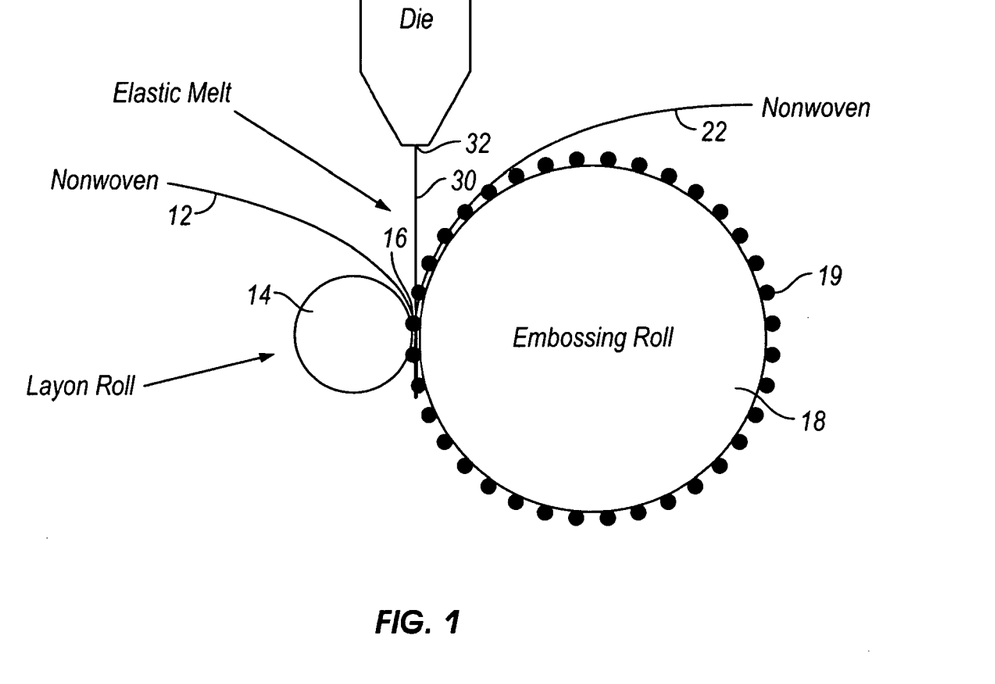
FIG. 1 is a schematic diagram showing a process for manufacturing the stretchable elastic laminate of the present technology.

Turning now to FIG. 1, there is schematically illustrated an extrusion lamination process for making a stretchable laminate of the presently described technology. A nonwoven fabric 12 is unwound from a supply roll (not shown) and travels from the supply roll over a layon roll 14 to a nip 16 created between the layon roll 14 and an embossing roll 18. The layon roll 14, which is also known in the art as a pressure roll, is coated with a silicone rubber coating and is typically water cooled or heated.

The silicone rubber coating on the layon roll 14 can be a smooth or flat surface coating. Alternatively, the layon roll 14 can be provided with a channeled or grooved silicone rubber surface. Use of a channeled rubber roll as the layon roll 14 creates discrete lanes or zones where the nonwoven fabric is only lightly bonded to the elastic layer, resulting in a laminate having increased elongation and better recovery after stretching, as will be discussed in further detail below.

The embossing roll 18 is provided with raised embossing elements 19 that impart an embossing pattern to the nonwoven. The embossing roll 18 is also typically water cooled or heated. Suitable temperatures for the layon roll and the embossing roll may be from about 60° F. to about 230° F., preferably from about 70° F. to about 180° F. A second nonwoven fabric 22 is unwound from a second supply roll (not shown) and travels from the second supply roll over the embossing roll 18 to the nip 16. Preferably, the layon roll 14 travels rotationally at the same surface speed as the embossing roll 18.

The raised elements of the embossing roll could be in the form of channels and grooves to perform the same function as the rubber roll described above. With these raised elements in lanes the rubber roll could be used with a relatively smooth surface if desired. Alternatively, the raised elements of the embossing roll could be used to apply a decorative look or improve laminate properties.

It has been found that improved resistance to delamination can be achieved in the stretchable laminates if the embossing roll is provided with a deep embossing pattern that imparts discontinuous, discrete dots, dashes, crosses, or other discontinuous discrete shapes. By a deep embossing pattern it is meant that the engraving depth of the embossing roll is at least about 0.008 inches. Preferably the engraving depth of the embossing roll is in the range of about 0.008 to about 0.5 inches, alternatively in the range of about 0.008 to about 0.4 inches, alternatively in the range of about 0.008 to about 0.3 inches, alternatively in the range of about 0.008 to about 0.2 inches, alternatively in the range of about 0.008 to about 0.1 inches, alternatively in the range of about 0.008 to about 0.060 inches. The depth of the pattern can vary depending upon the shape selected. For example, if the dot pattern is selected (illustrated in FIG. 4), the depth should be at least about 0.010 inches, alternatively from about 0.010 to about 0.060 inches. If the rectangular pattern is selected (illustrated in FIG. 3), the depth of the embossing should be at least about 0.008 inches, alternatively from about 0.008 to about 0.060 inches. A suitable depth for the dot pattern is about 0.031 inches, while a suitable depth for the rectangular pattern is about 0.023 inches.

Figure 2:
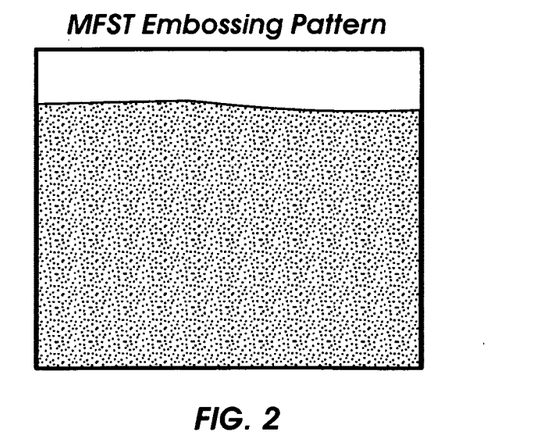
FIG. 2 illustrates a laminate having a shallow embossing pattern in accordance with the prior art.

Without being bound by a particular theory, it is believed that the deep embossing pattern imparted to the nonwoven fabric concentrates the compressive force in a small area to create discrete bonding sites. These discrete bonding sites provide improved resistance to delamination compared to typical shallow embossing patterns, having substantially greater bonding areas, such as male fine square taffeta (MFST) embossing patterns (illustrated in FIG. 2), which are about 0.0013 inches in depth.

An elastic material 30 is extruded through a die tip 32 at a temperature above the melting point of the elastic material so that the elastic material is melted. The melted elastic material drops down to the nip 16 between the layon roll 14 and the embossing roll 18 where it contacts the nonwoven fabric 12 and the nonwoven fabric 22. As the nonwoven fabrics 12 and 22 and the elastic material 30 travel through the nip 16, compressive force at the nip 16 causes the nonwoven fabric 22 to be embossed by the embossing roll 18 and causes the elastic material to physically entrap the fibers at the surfaces of the nonwoven fabrics, resulting, upon cooling of the elastic material, in an embossed stretchable laminate having an elastic layer bonded to the surfaces of the nonwoven fabrics but not embedded within them. A suitable compressive force at the nip may be from about 10 to about 150 pounds per lineal inch (PLI). It should also be appreciated by those skilled in the art that the embossing can also be accomplished by the lay on roll 14.

It will be appreciated by those skilled in the art that, although a three-layer stretchable laminate is illustrated in FIG. 1, a similar process can be used to manufacture a two-layer stretchable laminate or, alternatively, a stretchable laminate having more than three layers. In the case of a two-layer stretchable laminate, the nonwoven fabric can be delivered to the nip 16 either via the layon roll 14 or via the embossing roll 18, although preferably it would be delivered via the embossing roll 18 with the elastic melt traveling through the nip 16 adjacent to the layon roll 14. Slip agents may be added to the elastic material to minimize adherence of the elastic melt to the layon roll 14. Such slip agents may be, for example, euracylamide, and are well known to those of skill in the art.

It will also be appreciated by those skilled in the art that the compressive force used to bond the elastic layer to the nonwoven fabric may be generated using techniques other than conveying the elastic melt and the nonwoven fabric through a nip. Such alternative techniques may include, for example, using an air knife to blow the nonwoven fabric into the elastic melt, using a vacuum box to draw the elastic melt down into the nonwoven fabric, using nonwoven web tension to pull the nonwoven fabric into the elastic melt, using a static bar (static electric pressure), or combinations of these alternative techniques.

It should be further appreciated by those skilled in the art that according to the present technology, the elastic material 30, nonwoven fabrics 12 and 22 and resultant embossed stretchable laminate can be perforated. Such materials, nonwoven fabrics and laminates of the present technology can be perforated by any conventional means or processes known or utilized to perforate such materials. Thus, those skilled in art will appreciate that the step of perforation is included within the spirit and scope of the present technology.

The stretchable laminate resulting from the extrusion lamination and embossing process has sufficient adhesion between the elastic layer and the nonwoven fabric that delamination of the layers does not occur, yet the adhesion is not so strong that it negatively impacts the stretch properties of the laminate. The adhesion between the elastic layer and the nonwoven is such that no additional downstream bonding steps are necessary to insure that delamination between the layers does not occur.

An additional property achieved by the stretchable laminates of the presently described technology is improved resistance to stretching in the machine direction. This is an important property because it allows the laminate to be easily converted on a manufacturing line. Resistance to stretching is determined by measuring the tensile force required to stretch the laminate 5% in the machine direction. The greater the tensile force, the greater the laminate resists stretching in the machine direction as the laminate is processed through manufacturing equipment.

The improved tensile forces for the stretchable elastic laminates made in accordance with the present technology are achieved without utilizing additional processing techniques, such as necking of the nonwoven or laminate. The tensile forces at 5% machine direction stretch (tensile at 5% MD) for the stretchable laminates of the presently described technology may be as high as 150 grams, preferably 200 grams, more preferably 250 grams, and most preferably 300 grams or higher, without a necking step.

For some applications, it may be desirable to have a low stretch zone on the elastic laminate in order to assure a secure bond or attachment between the elastic laminate and a nonstretchy substrate. A low stretch zone is one in which the force to extend the laminate by 10% is greater than about 1000 grams for a 25 mm specimen. Such a low stretch zone or area can be achieved in the present elastic laminate in a variety of ways. For example, a tie layer coating can be applied to the surface of the nonwoven fabric where a low level of stretch is desired prior to lamination with the elastic melt. The tie layer would not cause appreciable stiffening, but would assure such a complete bond between the nonwoven fabric and the elastic layer that little stretch could occur in the tie layer region. Alternatively, a heavy bonding pattern could be applied to those areas of the laminate where a low level of stretch is desired to insure that there is a complete bond between the nonwoven fabric and the elastic layer. Alternatively, heat can be applied to the nonwoven fabric in zones which will at least partially fuse the nonwoven fabric or create a greater degree of bonding to the elastic material. The heat may be applied to the nonwoven fabric before lamination. One particularly recommended approach is heating the nonwoven fabric with IR heat directed to specific areas of the nonwoven, but other approaches such as contact with hot rollers can also achieve the desired result.

Another approach to create areas of low stretch is to use selective prestretching of the nonwoven fabric in the zones where a low level of stretch is desired in the finished elastic laminate. These prestrained regions of the nonwoven fabric would resist further elongation after being applied to the nonwoven. The prestraining can be accomplished with bowing techniques known to the industry. Such techniques include the use of small casters or wide rollers with a contoured surface, or a fixed rod or plate with a contoured surface. These bowing techniques increase the web path width and force the nonwoven to extend in the cross direction. This prestraining approach would have the additional benefit of creating areas of nonwoven fabric between the prestrained zones which have a greater level of potential stretch than they had originally. This would increase the level of final laminate stretch.

Another approach for creating low stretch zones is the use of heat after the laminate is formed wherein heat is applied in lanes to partially fuse the nonwoven fabric and/or increase its bond with the elastic material. This heat can be applied as radiative, convective or conductive heat. One particularly preferred approach is the use of hot rollers applied to the laminate at or close to the slitting station. With this approach the increased fusion can be more precisely positioned with respect to the edges of a slit laminate roll so that it is positioned more exactly where the end customer would desire it. The heated fusion is not necessarily continuously applied along the machine direction of the laminate, since any fusion pattern that is generally aligned in the transverse direction of the web would reduce the laminate stretch. Particularly preferred patterns would include transverse oriented line segments, bands or curved bands. Other approaches known in the art for creating low stretch zones may also be utilized. One such approach is to add strips of conventional polypropylene nonwoven fabric in lanes where little stretch is desired. This could be done on one or both sides of the stretchable laminate.

For some applications it may be desirable to increase the level of the elongation of the elastic laminate in the cross or transverse direction. One technique for increasing the elongation of the laminate would be the addition of available stretch in the nonwoven fabric by creating a greater path length for regions of the nonwoven fabric by extending the nonwoven fabric out of the plane of the nonwoven fabric (in the z-direction) in lanes or discrete zones that extend in the machine direction. These lanes or zones can be created by allowing the nonwoven fabric to contact and conform to a patterned roll before the nonwoven fabric makes contact with the elastic melt in the lamination process. The patterned roll could be either the layon roll or the embossing roll. The additional loft that occurs as a result of extending the nonwoven fabric in the z direction can create channels where air flow is permitted, resulting in enhanced comfort to the user. In applications where the loft is not desired for aesthetic reasons it can be available on one side of the laminate and not on the other and the lofty side can be positioned so that it is hidden from view in use. In a preferred embodiment of this approach, the flat, non-lofty side of the laminate would be comprised of a nonwoven fabric, such as the nonwoven fabric available under the trade name Dreamex™, which desirably would have a higher inherent elongation than the nonwoven fabric used for the lofty surface of the laminate.

Another alternative technique for increasing the elongation of the laminate is to create lanes or discrete zones where the nonwoven fabric is only lightly bonded to the elastic layer. Such lanes or zones can be created by utilizing a channeled or grooved roll and allowing the nonwoven fabric to conform to the grooved roll before the nonwoven fabric makes contact with the elastic melt. The grooved roll could be either the layon roll or a grooved steel roll used in place of the embossing roll.

Figure 5:
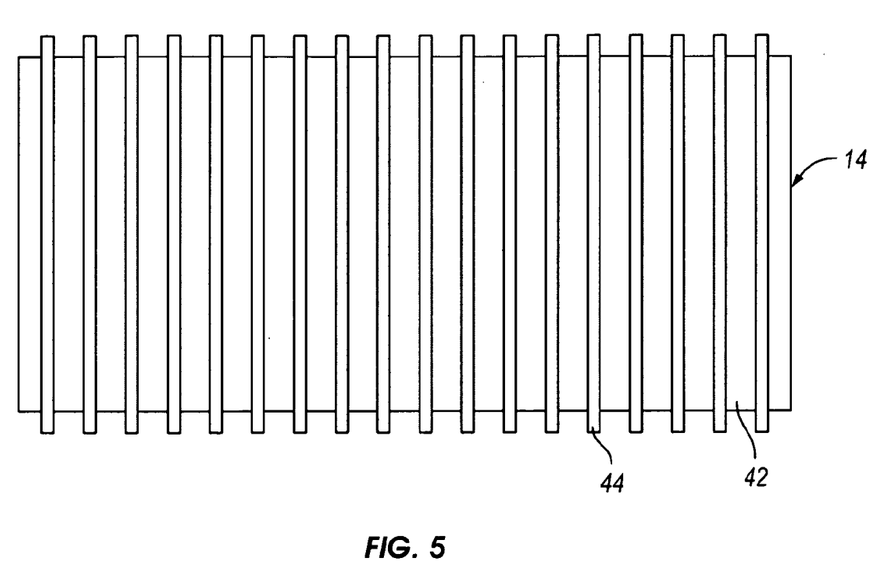
FIG. 5 illustrates a grooved surface for a layon roll used to manufacture the elastic laminate.

In one embodiment of this technique, the layon roll 14, illustrated in FIG. 1, is a silicone rubber roll having a series of alternating lands and grooves across its surface extending in the machine direction. The grooved surface is more clearly illustrated in FIG. 5. As shown in FIG. 5, the surface of the layon roll has a series of grooves 42 alternating with a series of lands 44. The grooved or open area on the surface of the layon roll should comprise at least 25% of the layon roll surface, alternatively about 40% of the surface and more preferably about 50% of the surface. The depth of the grooves can range from abut 0.0625 to about 0.250 inches. The width of the grooves can range from about 0.1 to about 0.5 inches and the width of the lands can range from about 0.1 to about 0.5 inches. The width of the grooves may be the same or different from the width of the lands. The grooves may also be all of the same width or depth or may have varying widths or depths. Similarly, the lands may all be of the same width or may have varying widths. The particular grooved pattern selected will depend upon the particular properties and aesthetics desired for the laminate.

As the nonwoven fabric is conveyed over the layon roll, the lands 44 contact the nonwoven fabric and press the opposing surface of the nonwoven fabric into the elastic melt as the nonwoven fabric and elastic melt travel through the nip. The lands thus form first zones or lanes in the nonwoven fabric where the nonwoven fabric is compressed and is strongly bonded to the elastic melt. The adjacent grooves 42 on the layon roll, however, do not exert lamination pressure, resulting in second zones or lanes in the nonwoven fabric that are less compressed and loftier than the first zones and where the nonwoven fabric is only lightly bonded to the elastic layer. These lightly bonded zones are able to more freely extend and thereby have more stretch than the strongly bonded zones resulting from the lamination force exerted by the raised lands on the layon roll. The creation of the lightly bonded narrow lanes in the nonwoven fabric can be further enhanced by pressing the nonwoven fabric into the channels on the roll by using, for example, an air knife or fingers fitting within the rubber roll channels. In a preferred embodiment of this approach, the laminate has a nonwoven fabric, preferably a spunlaced nonwoven fabric, on one side which is subjected to the grooved or channeled roll, and a flat nonwoven fabric which inherently has a high amount of stretch, such as Dreamex™ nonwoven fabric, on the other side of the laminate.

Figure 3:
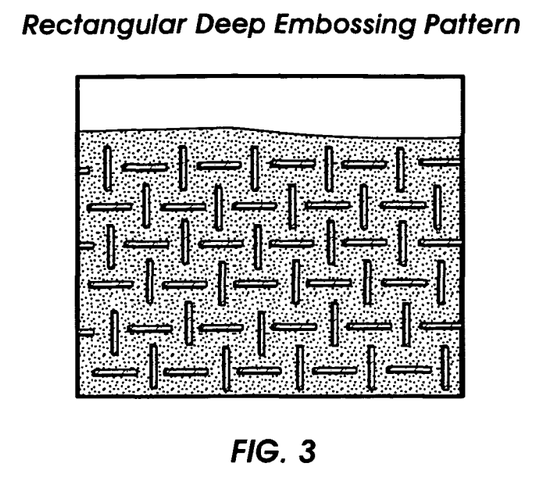
FIG. 3 illustrates an embodiment of a laminate having a rectangular deep embossing pattern in accordance with the present technology.
Figure 4:
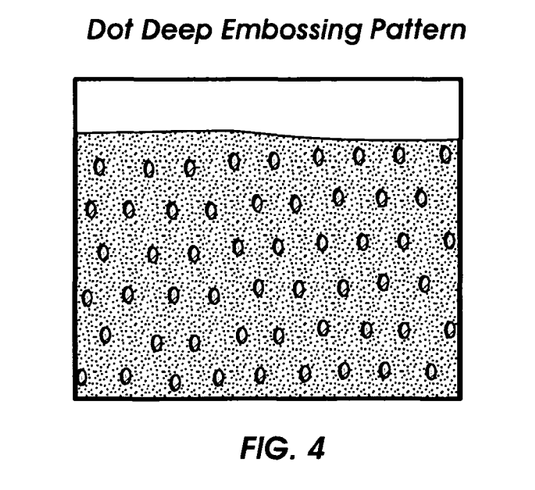
FIG. 4 illustrates an embodiment of a laminate having a dot deep embossing pattern in accordance with the present technology.

Excellent aesthetics and improved stretch, along with good delamination resistance, can be achieved when the grooved layon roll is used in combination with an embossed roll during the manufacture of the elastic laminate. The embossing pattern can be any pattern, although best results in terms of delaminating resistance are achieved when a deep embossing pattern, such as those illustrated in FIGS. 3 and 4, is used in combination with the grooved layon roll.

Although it is generally known in the art that higher elongation is an advantage for elastic laminates, it is not generally recognized that there is an advantage to a laminate having two stages of elongation. The first stage can be nonrecoverable or less recoverable and the second stage elastically recoverable. With a nonrecoverable first stage it is possible to reduce the amount of elastic laminate employed in a garment. A shorter segment of elastic laminate could be utilized to save cost. The user would extend the laminate through its first nonrecoverable stage of elongation until it is close to the desired minimum length for its fit function. The second stage of recoverable elongation for the laminate would correspond more closely with the desired fit range of the garment.

An elastic laminate with this desired two stages of elongation can be created in accordance with the present technology through the removal of laminate material, the selected rupturing of the elastic sheet, or, alternatively the selected slitting of the nonwoven fabric, such that the initial elongation of the laminate in the cross direction is directed toward partially closing up the voids or slits created in the laminate. One technique that can be employed to accomplish the two stage elongation is the use of die cutting to produce open spots in the laminate through material removal. One pattern that can be used for this approach is an array of ovals or parallelograms or the like with the long axis generally aligned in the machine direction of the laminate.

Another alternative technique is the use of die cutting to slit the laminate without removal of material. A preferred pattern for this approach is an array of slits generally aligned in the machine direction of the laminate. If the slits were made while the elastic layer is still melted, the slits would likely be oval shaped. The slits would preferentially be interrupted with cross direction elements designed to blunt any tear propogation in the machine direction as the laminate is stretched in the cross direction. A die cut resembling an I-beam is particularly preferred for this purpose. In another alternative, rather than cutting slits through the entire laminate, slits could be cut into one or both of the nonwoven fabric layers only, prior to contacting with the elastic melt. This alternative is advantageous because the elastic film layer remains intact, thereby maintaining laminate strength and integrity, without limiting laminate stretch.

One skilled in the art will recognize that modifications may be made in the presently described technology without deviating from the spirit or scope of the invention. The presently described technology is also illustrated by the following examples, which are not to be construed as limiting the invention or scope of the specific procedures or compositions described herein. The following examples illustrate the benefits that are obtained when a grooved rubber roll is utilized as the layon roll during manufacture of the laminate.

EXAMPLE 1

A three layer extrusion laminate was prepared by extruding a melt of an elastic resin from a die, such as die 32 shown in FIG. 1, into the nip between a layon roll, and an embossing roll, such as layon roll 14 and embossing roll 18 shown in FIG. 1. The layon roll employed in this Example is a silicone rubber roll having a surface pattern of alternating lands and grooves extending in the machine direction across the entire surface of the roll. Each of the grooves had a width of 0.250 inches, and a depth of 0.125, and each of the lands had a width of 0.250 inches. The surface of the embossing roll employed in this Example has a male fine square taffeta (MFST) embossing pattern, (See FIG. 2). The melted elastic layer is a multi-layer structure formed from a co-extruded melt wherein the outer layers of the co-extruded multi-layer structure are tie layers and the core layer is a styrene-ethylene/butylene-styrene resin available from Kraton Polymers of Houston, Tex. under the trade name Kraton G-6692. The elastic layer comprises the following:

BYNEL® E418 5% by weight outer layer/KRATON G6692 90% by weight core/BYNEL® E418 5% by weight outer layer.

The elastic layer has a basis weight of 48 gsm.

A first nonwoven web made from a PET spunlace material having a basis weight of about 30 gsm and available from E.I. DuPont de Nemours, travels over the layon roll to the nip and a second, nonwoven web made of the PET spunlace material travels over the embossing roll to the nip where the first and second nonwoven webs each make contact with the elastic melt. Pressure at the nip causes the lands of the layon roll to press the first nonwoven web into the elastic melt while the adjacent grooves on the layon roll do not exert lamination pressure. Simultaneously, pressure at the nip causes the embossing roll to form the MFST embossed pattern on the outer surface of the second nonwoven web, as well as press the second nonwoven web into the elastic melt. The resulting laminate is a three layer embossed laminate having a basis weight of 118.75 gsm. The elastic layer of the laminate is sandwiched between the first and second nonwoven webs, and the elastic layer is more strongly bonded to the first nonwoven web where the land areas pressed the nonwoven web into the elastic melt than the areas where the grooves of the roller contacted the nonwoven web.

EXAMPLE 2

A three layer extrusion laminate was prepared in the same manner as Example 1, using the same elastic resin melt and the same PET spunlace nonwoven material for the first and second nonwoven layers as the laminate made in Example 1, except that the embossing roll is provided with the deep rectangular embossing pattern illustrated in FIG. 3. The resulting laminate had a basis weight of 126.16 gsm.

EXAMPLE 3

Comparative

A three-layer extrusion laminate was prepared in the same manner as Example 2, using the same elastic resin and the same PET spunlace nonwoven material for the first and second nonwoven layers as the laminate made in Example 2, except that the layon roll is provided with a smooth or flat silicone rubber surface rather than the grooved surface used in Example 2. The resulting laminate had a basis weight of 121.88 gsm.

Each of the laminates made in Examples 1-3 were tested to measure the force during extension and retraction in 100% hysteresis tests using an Instron mechanical testing machine. The test is a cyclic test to 100% elongation. The initial crosshead gap is 1" and the jaw separation is 20"/minute. Three cycles are made without pause between the starting point and 100% elongation. On each cycle, the force is measured at extension (load) at 25, 50, 75 and 100% and during retraction (unload) at 25, 50 and 75%. The results for Examples 1-3 are set forth below in Table 1.

TABLE 1

| Specimen # | | Example 3 | Example 2 | Example 1 |
|---|---|---|---|---|
| Cross Direction Tensile Test | | | | |
| Peak Tensile Force | grams | 2709 | 2482 | 2390 |
| Peak Tensile Elong | % | 201 | 185 | 186 |
| Cross Direction - 100% Hysteresis Tests | | | | |
| Peak Load | gf | 1281 | 1418 | 1393 |
| CY1-Load@ 25% | gf | 377 | 372 | 385 |
| CY1-Load@ 50% | gf | 628 | 652 | 689 |
| CY1-Load@ 75% | gf | 893 | 965 | 994 |
| CY1-Load@ 100% | gf | 1197 | 1320 | 1303 |
| CY1-Unload@ 75% | gf | 224 | 277 | 265 |
| CY1-Unload@ 50% | gf | 152 | 192 | 184 |
| CY1-Unload@ 25% | gf | 66 | 88 | 85 |
| CY2-Load@ 25% | gf | 105 | 129 | 133 |
| CY2-Load@ 50% | gf | 232 | 272 | 262 |
| CY2-Load@ 75% | gf | 353 | 393 | 372 |
| CY2-Load@ 100% | gf | 785 | 862 | 848 |
| CY2-Unload@ 75% | gf | 218 | 269 | 258 |
| CY2-Unload@ 50% | gf | 148 | 186 | 180 |
| CY2-Unload@ 25% | gf | 61 | 83 | 79 |
| CY3-Load@ 25% | gf | 90 | 115 | 117 |
| CY3-Load@ 50% | gf | 214 | 255 | 246 |
| CY3-Load@ 75% | gf | 315 | 357 | 334 |
| CY3-Load@ 100% | gf | 663 | 715 | 698 |
| CY3-Unload@ 75% | gf | 213 | 266 | 255 |
| CY3-Unload@ 50% | gf | 144 | 184 | 178 |
| CY3-Unload@ 25% | gf | 58 | 80 | 77 |
| SetExtUnload 1 | % | 15:30% | 13.20% | 13.50% |
| SetExtLoad2 | % | 15.60% | 13.60% | 13.60% |
| SetExtUnload2 | % | 16.40% | 14.10% | 14.50% |
| SetExtLoad3 | % | 16.90% | 14.60% | 14.50% |
| SetExtUnload3 | % | 16.90% | 14.50% | 14.90% |

The higher the force measured during the retraction phase of the cycle, the better the laminate will grip after stretching. As can be seen from the results shown in Table 1, the laminates made in Example 1 and Example 2, utilizing the channeled rubber roll, had higher retraction forces than the Example 3 laminate. Best results were obtained with the combination of the deep pattern embossing roll and the channeled rubber roll in Example 2, although the Example 1 laminate employing a MFST embossing pattern also achieved excellent results. Especially noteworthy are the excellent retraction forces achieved by the Example 1 and Example 2 laminates at 50% and 25% unloading, especially during the second and third cycles. These results demonstrate that the Example 1 and Example 2 laminates have improved stretch and gripping properties compared to the Example 3 laminate, especially after multiple stretch cycles.

The invention has now been described in such full, clear, concise and exact terms as to enable any person skilled in the art to which it pertains, to practice the same. It is to be understood that the foregoing describes preferred embodiments and examples of the invention and that modifications may be made therein without departing from the spirit or scope of the invention as set forth in the claims.

The invention claimed is:

1. A stretchable elastic laminate comprising:
at least one spunlace nonwoven fabric that is stretchable in at least one direction, the nonwoven fabric having at least one first machine direction zone and at least one second machine direction zone, wherein the first machine direction zone is more compressed than the second machine direction zone; and
an elastic layer on a major surface of said nonwoven fabric, wherein the at least one spunlace nonwoven fabric has a discontinuous embossed pattern along the bond between the elastic layer and the at least one spunlace nonwoven fabric, and
wherein the elastic layer is more strongly bonded to the surface of said nonwoven fabric at said first machine direction zone than at said second machine direction zone.

2. The stretchable elastic laminate of claim 1, wherein the nonwoven fabric has a set of first machine direction zones and a set of second machine direction zones.

3. The stretchable elastic laminate of claim 2, wherein the first machine direction zones alternate with the second machine direction zones.

4. The stretchable elastic laminate of claim 2, wherein the second machine direction zones comprise at least 25% of the surface of the nonwoven fabric.

5. The stretchable elastic laminate of claim 2, wherein the second machine direction zones comprise about 40% of the major surface of the nonwoven fabric.

6. The stretchable elastic laminate of claim 2, wherein the second machine direction zones comprise about 50% of the major surface of the nonwoven fabric.

7. The stretchable elastic laminate of claim 6, wherein the laminate further comprises a second nonwoven fabric and the elastic material is applied to a major surface of the second nonwoven fabric so that the elastic layer is sandwiched between and bonded to the major surfaces of the nonwoven fabric and the second nonwoven fabric.

8. The stretchable elastic laminate of claim 7, wherein the second nonwoven fabric has an embossing pattern applied to a major surface of the second nonwoven fabric opposite the major surface receiving the elastic material.

9. The stretchable elastic laminate of claim 8, wherein the embossing pattern comprises discontinuous discrete shapes having a depth of at least about 0.008 inches.

10. The stretchable elastic laminate of claim 1, wherein the first and second zones are imparted to the nonwoven fabric by a grooved roll having a groove depth in the range of about 0.065 to about 0.250 inches.

11. The stretchable elastic laminate of claim 10, wherein the grooved roll has a surface comprising a series of grooves alternating with a series of lands.

12. The stretchable elastic laminate of claim 11, wherein the grooves on the surface of the roll have a width ranging from about 0.1 to about 0.5 inches.

13. The stretchable elastic laminate of claim 11, wherein the lands on the surface of the roll have a width ranging from about 0.1 to about 0.5 inches.

14. The stretchable elastic laminate of claim 7, wherein the nonwoven fabric is a spunlace nonwoven fabric and the second nonwoven fabric is a spunbond nonwoven fabric.

15. The embossed stretchable elastic laminate of claim 1, wherein the laminate has a basis weight of about 68 gsm to about 128 gsm.

16. The embossed stretchable elastic laminate of claim 1, wherein the spunlace fabric has a basis weight of about 20 to about 80 gsm and is stretchable in an amount of about 50% to about 200% of an initial length.

17. The embossed stretchable elastic laminate of claim 1, wherein the spunlace fabric has a basis weight of about 30 gsm and is stretchable in the cross-direction.

18. The embossed stretchable elastic laminate of claim 1, wherein the elastic melt layer and the nonwoven layer have zones of increased cross-direction elongation.

19. The embossed stretchable elastic laminate of claim 1, wherein the elastic material is applied as a melt to the surface of the nonwoven layer.

20. The embossed stretchable elastic laminate of claim 1, the nonwoven layer has a melting point greater than the melting point of the elastic material.

21. The embossed stretchable elastic laminate of claim 15, wherein the laminate has a basis weight of about 118 gsm.

22. The embossed stretchable elastic laminate of claim 15, wherein the laminate has a basis weight of about 121 gsm.

23. The embossed stretchable elastic laminate of claim 15, wherein the laminate has a basis weight of about 126 gsm.

24. A component for an absorbent article comprising:
at least one spunlace nonwoven fabric that is stretchable in at least one direction, the nonwoven fabric having at least one first machine direction zone and at least one second machine direction zone, wherein the first machine direction zone is more compressed than the second machine direction zone; and
an elastic material applied as a melt onto a major surface of the nonwoven fabric, wherein the melt forms an elastic layer that is bonded to the major surface, and
wherein the elastic layer is more strongly bonded to the major surface at the first machine direction zone than at the second machine direction zone, wherein the at least one spunlace fabric has a basis weight of about 20 grams per square meter (gsm) to about 80 gsm and is stretchable in an amount of about 50% to about 200% of an initial length.

25. A stretchable elastic laminate comprising:
Two nonwoven fabrics that are stretchable in at least one direction, the fabrics have a basis weight of about 20 grams per square meter (gsm) to about 80 gsm and are stretchable in an amount of about 50% to about 200% of an initial length; and
an elastic material applied as a melt to a major surface of said nonwoven fabrics, wherein the melt forms an elastic layer bonded to the surface of the nonwoven fabrics; the surface of the nonwoven fabric having at least one first machine direction bonding zone having a first bonding strength and at least one second machine direction bonding zone having a second bonding strength,
wherein the elastic layer is between the two nonwoven fabrics, the bonding strength of the first bonding zone to the elastic layer is greater than the bonding strength of the second bonding zone to the elastic layer, the laminate has a basis weight of about 68 gsm to about 128 gsm, and the fabrics having a melting point that is greater than the temperature of the elastic material, and the spunlace nonwoven fabrics have a deep embossed pattern along the bond between the elastic layer and the spunlace nonwoven fabrics, wherein the engraving depth of an embossing roll is at least about 0.008 inches.

* * * * *